United States Patent [19]

Okazaki et al.

[11] Patent Number: 5,340,204

[45] Date of Patent: Aug. 23, 1994

[54] VEHICLE SLIP CONTROL SYSTEM

[75] Inventors: Haruki Okazaki; Makoto Kawamura; Kazutoshi Nobumoto; Fumio Kageyama, all of Hiroshima, Japan

[73] Assignee: Mazda Motor Corporation, Hiroshima, Japan

[21] Appl. No.: 137,385

[22] Filed: Oct. 18, 1993

Related U.S. Application Data

[63] Continuation of Ser. No. 753,439, Aug. 30, 1991, abandoned.

[30] Foreign Application Priority Data

Aug. 31, 1990 [JP] Japan .................................. 2-230157
Jan. 28, 1991 [JP] Japan .................................. 3-008632

[51] Int. Cl.5 ...................... B60T 8/32; B60K 28/16
[52] U.S. Cl. ................................ 303/111; 303/113.2; 303/113.5; 364/426.03
[58] Field of Search ..................... 303/100, 111, 113.5, 303/113.1, 113.2, 92, 103; 364/426.02, 426.03; 180/197

[56] References Cited

U.S. PATENT DOCUMENTS

| | | | |
|---|---|---|---|
| 3,897,114 | 7/1975 | Scharlack | 303/110 |
| 4,344,139 | 8/1982 | Miller et al. | 303/96 |
| 4,793,662 | 12/1988 | Arikawa | 303/111 |
| 4,861,118 | 8/1989 | Burckhardt et al. | 303/113 TR |
| 4,883,326 | 11/1989 | Sugitani et al. | 303/110 |
| 5,015,041 | 5/1991 | Kuwana et al. | 303/111 |

FOREIGN PATENT DOCUMENTS

| | | |
|---|---|---|
| 395594 | 4/1990 | European Pat. Off. . |
| 3801322 | 7/1989 | Fed. Rep. of Germany . |
| 61-183249 | 8/1986 | Japan . |

Primary Examiner—Matthew C. Graham
Attorney, Agent, or Firm—Keck, Mahin & Cate

[57] ABSTRACT

A slip control system for a vehicle having rear right and left drive wheels includes a traction control for controlling a slip rate of a wheel by controlling a braking hydraulic pressure for the wheel under a non-braking condition. The slip rate of a wheel is controlled, by controlling the braking hydraulic pressure for the wheel under a braking condition, so as to provide an anti-skid control. A start of the control of the slip rate is restricted by the anti-skid control. The control of the slip rate by the anti-skid control is applied commonly to the right and left drive wheels, while the control of the slip rate by the traction control is applied independently to the right and left drive wheels. The anti-skid control can be always properly carried out without being affected by the traction control.

26 Claims, 9 Drawing Sheets

FIG. 9 ial control of the braking hydraulic pressure, the control being carried out by the anti-skid braking control means.

VEHICLE SLIP CONTROL SYSTEM

This is a continuation of U.S. patent application Ser. No. 07/753,439, filed Aug. 30, 1991, abandoned.

BACKGROUND OF THE INVENTION

1. Field of the Invention

The present invention relates to a vehicle which is provided with both a traction control system and an anti-skid braking system in which a braking hydraulic pressure is adjusted to control a slip rate of a driving wheel of the vehicle.

2. Description of the Prior Art

Conventionally, there has been known a traction control in which a slip rate of a drive wheel is calculated and a braking hydraulic pressure is controlled to obtain a target slip rate of the drive wheel so that an excessive torque is not transmitted to the driving wheel. This prevents the wheel from racing, which deteriorates acceleration properties.

On the other hand, there has been also known an anti-skid braking system in which a slip rate of a driving wheel is calculated and a braking hydraulic pressure is controlled to obtain a target slip rate of the driving wheel so that an excessive braking force is not transmitted to the driving wheel. This prevents the wheel from lockings which deteriorates braking properties.

Furthermore, there has been known a vehicle, as shown in Japanese Utility Model Public Disclosure (JP, U) No. 61-183249, which is provided with both the traction control system and the anti-skid braking system.

It should, however, be noted that if the anti-skid control is started just after the traction control in the case where both the traction control system and the anti-skid control system are provided in a rear wheel drive vehicle, the braking pressure may be unduly reduced during the anti-skid braking control so that the braking control may be unduly deteriorated.

In detail, the traction control of the vehicle is generally applied independently to right and left drive wheels. On the other hand, the anti-skid control is applied in common to the right and left drive wheels so as not to lock whichever drive wheel tends to be locked.

For instance, when the left drive wheel races for some reason and the acceleration pedal is operated for accelerating the vehicle, the traction control is carried out so as to eliminate the racing of the left drive wheel by controlling the braking hydraulic pressure for the right and left drive wheels independently. At this moment, if the brake pedal is operated for braking, the traction control terminates. However, the braking hydraulic pressure partially remains in a hydraulic control system for the left drive wheel even though the traction control is finished. Then, the braking pressure is commonly increased for both the right and left drive wheels with a pressure difference because of the residual pressure applied to the left drive wheel. Thereafter, when the braking pressure is increased to a level which produces a lock condition of a drive wheel, the anti-skid control is initiated so as to eliminate the lock condition by reducing or holding the braking pressure for both drive wheels commonly. In this case, even though the braking pressure for the right wheel does not reach a level which is high enough to produce the locking condition, the braking pressures for the right drive wheel and for the left drive wheel are reduced. Since the pressure difference between the right and left drive wheels still remains and the anti-skid control is applied commonly to the right and the left drive wheels, the braking pressure for the right drive wheel may not be enough to provide a desired braking effect.

SUMMARY OF THE INVENTION

It is, therefore, an object of the present invention to provide an improved vehicle which is provided with both a traction control system and an anti-skid braking control system.

It is another object of the present invention to provide an improved control system which can carry out both the traction control and the anti-skid braking control.

It is further object of the present invention to provided a traction control system and an anti-skid braking control system which do not affect each other.

The above and other objects of the present invention can be accomplished by a slip control system for a vehicle having rear right and left drive wheels comprising traction control means for controlling a slip rate of a wheel by controlling a braking hydraulic pressure for the wheel under a non-braking condition, anti-skid control means for controlling the slip rate of a wheel by controlling the braking hydraulic pressure for the wheel under a braking condition, and restriction means for restricting a start of the control of the slip rate by the anti-skid control means. The control of the slip rate by the anti-skid control means is applied commonly to the right and left drive wheels, while the control of the slip rate by the traction control means is applied independently to the right and left drive wheels.

According to another of the features of the present invention, a threshold value as to when the control of the slip rate by the anti-skid braking control means is to be started is provided for each of the drive and passive wheels wherein the threshold for the drive wheels is determined in a manner that the anti-skid control for the drive wheel is started after that for the passive wheels. This constitutes the restriction means for starting the anti-skid control.

In another aspect of the present invention, the restriction means may allow the anti-skid braking control means to start controlling the braking hydraulic pressure a predetermined time period after the slip rate of the drive wheel exceeds a predetermined value.

In another embodiment, the restriction means allows the anti-skid braking control means to start controlling the braking hydraulic pressure after the hydraulic pressures for the right and left drive wheels are settled to have the same pressure values.

It is also possible that whenever the traction control terminates, the start of the hydraulic pressure by the anti-skid control means is delayed for the drive wheels.

It is also possible to provide delay means for delaying the start of the anti-skid control when the residual hydraulic pressure for a drive wheel resulting from the traction control is greater than a predetermined value.

The delay means provides a threshold value for delaying the anti-skid control. The threshold value may be provided based on a deceleration of a wheel speed. Alternatively, the threshold value can be provided based on a parameter such as a hypothetical vehicle speed related to a wheel speed. In yet another embodiment, the delay means can be provided as prohibiting means for prohibiting the start of reduction and a holding of the hydraulic pressure under the anti-skid control.

According to the present invention, the braking hydraulic pressure is controlled for braking the drive wheels through the traction control. The braking hydraulic pressure is controlled for the drive and passive wheels so that the slip rate of the passive and drive wheels can be controlled. According to the present invention, the restriction means restricts the start of the anti-skid braking control for the drive wheels so that whenever the anti-skid braking control is started, the control for the passive wheels is carried out prior to that for the drive wheels and the anti-skid braking control for the drive wheel is carried out after the hydraulic pressures of the right and left drive wheels are substantially equalized.

For instance, the threshold for starting the slip rate control by means of the anti-skid control means is provided for the drive and passive wheels, respectively, wherein the threshold value for the drive wheel is greater than that for the passive wheel so that the start of the anti-skid control for the drive wheels is deferred from that for the passive wheels.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Hereinafter, an embodiment of the present invention will be explained by making reference to the accompanying drawings.

Summary of the Construction of the Vehicle

Figure 1:
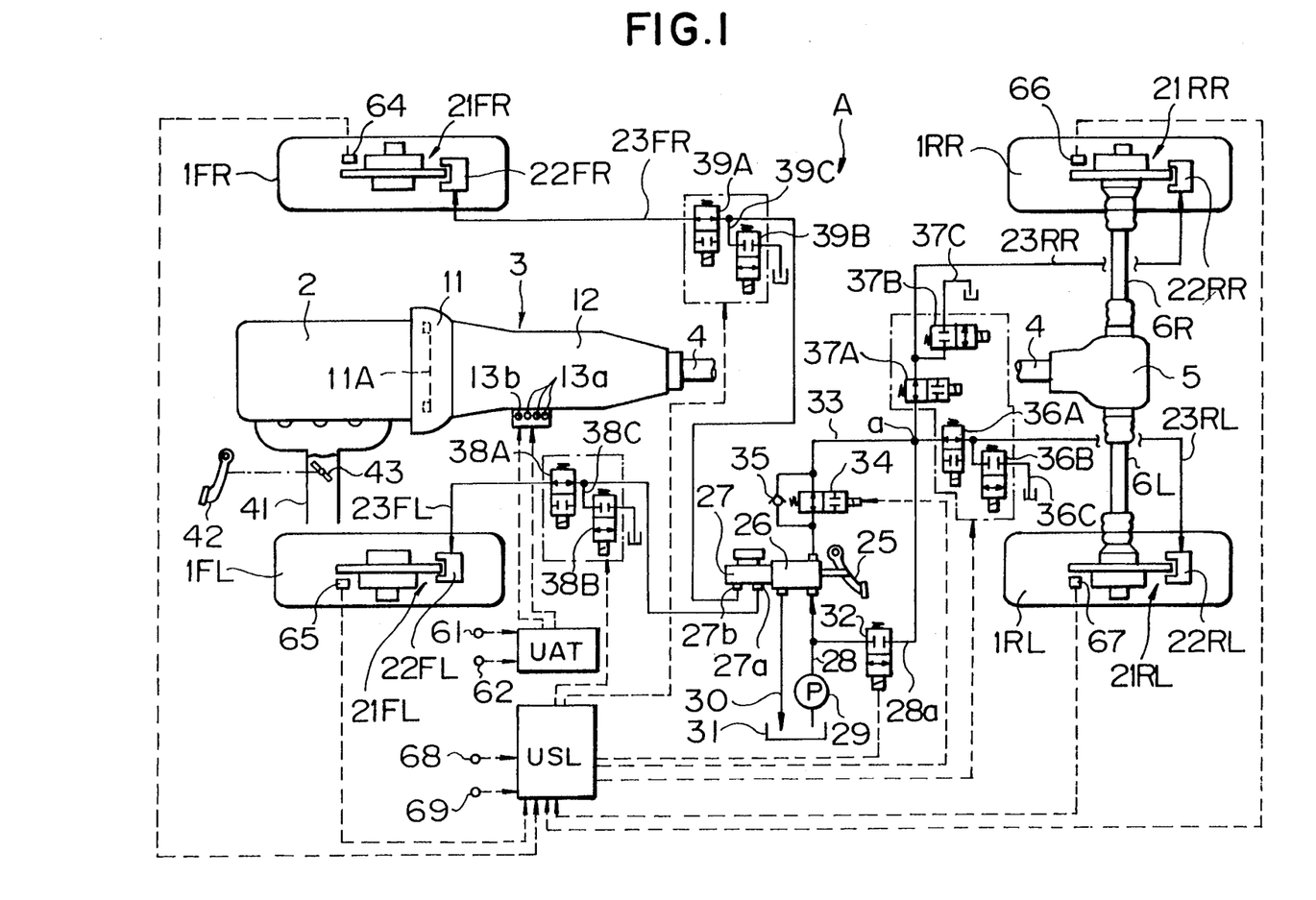
FIG. 1 is a complete system diagram of the preferred embodiment of the present invention.

FIG. 1 is a system diagram of a vehicle engine and a hydraulic circuit for controlling the wheel brakes to which the present invention is applied.

In the illustrated system, a hydraulic pressure is controlled for a braking action of drive wheels to accomplish the traction control. The hydraulic pressure is controlled for the braking action of the drive and passive wheels to accomplish the anti-skid control. In the traction control, the hydraulic pressure for braking is controlled independently for each of the drive wheels to suppress a slip rate thereof so that it stays within a certain range. In the anti-skid control, the hydraulic pressure for braking is controlled for each of the passive wheels independently but for both drive wheels commonly.

Vehicle A is provided with the above mentioned wheels, that is passive wheels 1 FL and 1 FR, and drive wheels 1 RL and 1 RR.

Engine 2 is loaded in the front portion of the body of vehicle A. The output side of engine 2 or, more specifically, the output side of automatic transmission 3 is connected to propeller shaft 4. Engine output is transmitted to the left and right drive wheels 1 RL and 1RR by means of the drive wheel axles 6 L and 6 R and by means of the differential gear device 5 which is connected to propeller shaft 4.

Construction of the Automatic Transmission

The automatic transmission 3 is comprised of a torque converter 11 and a multispeed gear box 12. In addition, in order to switch the hydraulic circuit to the desired speed, a plurality of solenoids 13a are provided in the multispeed gearbox 12. Torque converter 11 is provided with a lock-up clutch 11A. Solenoid 13b is provided for controlling the operation of the lock-up clutch 11A.

An automatic transmission control unit UAT is provided for controlling the above solenoids 13a and 13b. A shift control map and a map for controlling the lock-up are stored in the automatic transmission control unit UAT. The control unit UAT generates control signals sent to the solenoids 13a and 13b with reference to these maps and thus controls the speed and the lock-up.

In order to achieve the above object, the following signals are sent to the control unit UAT: a signal from the main throttle valve opening sensor 61 which detects the opening of the main throttle valve 43, which is connected to an acceleration pedal 42; and a signal from the speed sensor 62 which detects the vehicle speed. In place of the speed sensor, one may use a sensor which detects the rotational speed of the propeller shaft 4 as illustrated.

Construction of the Brake Hydraulics Adjustment Mechanism

An hydraulic brake system is provided for braking each of the wheels 1. Brakes 21 FR, 21 FL, 21 RR and 21 RL are provided, respectively for each of the wheels 1 FR, 1 FL, 1 RL, and 1 RR. Respective brake cylinders 22 FR, 22 FL, 22 RR, and 22 RL are provided for each brake 21. The brake cylinders 22 are provided with respective conduits 23 FR, 23 FL, 23 RR, and 23 RL for supplying brake fluid.

The brake system is provided with a brake pedal 25 by means of which the driver of the vehicle registers a treading force, a force multiplying device 26 which multiplies the pedal treading force by using an hydraulic booster, and a tandem-type master cylinder 27 for being connected to the device 26. The master cylinder 27 is connected to the various brakes as follows: first exhaust port 27a is connected to the left front wheel brake 21 FL by means of brake line 23 FL; second exhaust port 27b is connected to right front wheel brake 21 FR by means of brake line 23 FR.

The power multiplying device 26 is connected to pump 29 by means of line 28 so that the pump 29 can supply hydraulic fluid thereto.

Excess hydraulic fluid is made to return to a reserve tank 31 through a return line 30 connected to the pump 29. Branch line 28a branches off of line 28. An electromagnetic closing valve 32 is arranged in line 28a. A line 33 extends from power multiplying device 26. Electromagnetic valve 34 is provided in line 33 and a unidirectional valve 35 is provided in a parallel arrangement to valve 34.

At down-stream position a, branch line 28a and line 33 flow together. At point a, the lines 28a, 33 are connected to the brake lines 23 RL, 23 RR for the rear wheel brakes. Electromagnetic valves 36A, 37A, 38A and 39A are disposed in lines 23 RL and 23 RR, 23FL and 23FR, respectively. Down stream of valves 36A, 37A, 38A and 39A, respectively, electromagnetic valves 36B, 37B, 38B and 39B are provided in relief lines 36C, 37C, 38C and 39C which are connected with the lines 23 RL and 23 RR, 23FL and 23FR.

Braking Hydraulic Pressure Control

The valves 32, 34, 36A, 37A, 38A, 39A, 36B, 37B, 38B and 39B are controlled by a slip control unit USL which constitutes a traction control device and an anti-skid control device. The valve 32 is closed and the valve 34 is opened, and the valves 36B, 37B, 38B and 39B are closed and the valves 36A, 37A, 38A and 39A are opened, as shown in FIG. 1 when neither the traction control nor the anti-skid control is executed. In this condition, when the brake pedal 25 is treaded on the braking hydraulic pressure is introduced into the front wheel brakes 21FR, 21FL through the master cylinder 27. The braking hydraulic pressure is introduced into the rear wheel brakes 21RR, 21RL through the line 33 and the power multiplying device 26.

When the traction control is executed for the rear wheels 1RR, 1RL as drive wheels, the valve 32 is opened and the valve 34 is closed. The braking hydraulic pressure is held, increased and decreased by means of a duty control applied on the valves 36A, 36B, 37A and 37B. For example, when the valves 36A, 36B, 37A and 37B are closed in the case where the valve 32 is closed, the braking pressure is held. When the valves 36A and 37A are opened and the valves 36B and 37B are closed in the case where the valve 32 is closed, the braking hydraulic pressure is increased. When the valves 36A and 37A are closed and the valves 36B and 37B are opened in the case where the valve 32 is closed, the braking hydraulic pressure is decreased. Once the hydraulic pressure is supplied through the branch line 28a, it does not apply a reactive force on the brake pedal 25 by virtue of the unidirectional valve 35.

Irrespective of the traction control, the hydraulic pressure is introduced into the rear wheel brakes 21RR, 21RL as a braking pressure through the unidirectional valve 35 from the power multiplying device 26 when the brake pedal 25 is treaded on.

When the anti-skid control is executed for the rear wheels 1RL, 1RR, the valve 32 is closed and the valve 34 is opened. Then, the braking hydraulic pressure is held, increased and decreased by means of the duty control on the valves 36A, 36B, 37A and 37B, as with the traction control.

When the anti-skid control is executed for the front wheels 1FL, 1FR, the braking hydraulic pressure is controlled by means of the duty control on the valves 38A, 38B, 39A and 39B.

Slip Control Unit USL

The slip control unit USL executes the traction control for the drive wheels 1RL, 1RR by means of the braking hydraulic pressure control and the anti-skid control for the passive and drive wheels 1FL, 1FR, 1RL and 1RR by means of the braking hydraulic pressure control.

The slip control unit USL receives signals from wheel speed sensors 64–67 for detecting wheel rotation speeds of the respective wheels, a brake sensor 68 for sensing whether or not the brake pedal 25 is treaded on by an ON(treaded)-OFF signal, and a brake pressure sensor 69 for sensing the braking hydraulic pressure for the respective wheel brakes.

The slip control unit USL includes an input interface for receiving various signals from the sensors aforementioned, a micro computer having a CPU, ROM, and RAM and a drive circuit for actuating the valves 32, 34, 36A, 37A, 38A, 39A, 36B, 37B, 38B and 39B. In the ROM, control programs for the traction and anti-skid controls and various maps utilized in the control are stored. In the RAM, various memories are provided for executing the controls.

Contents of the Traction Control

Figure 2:
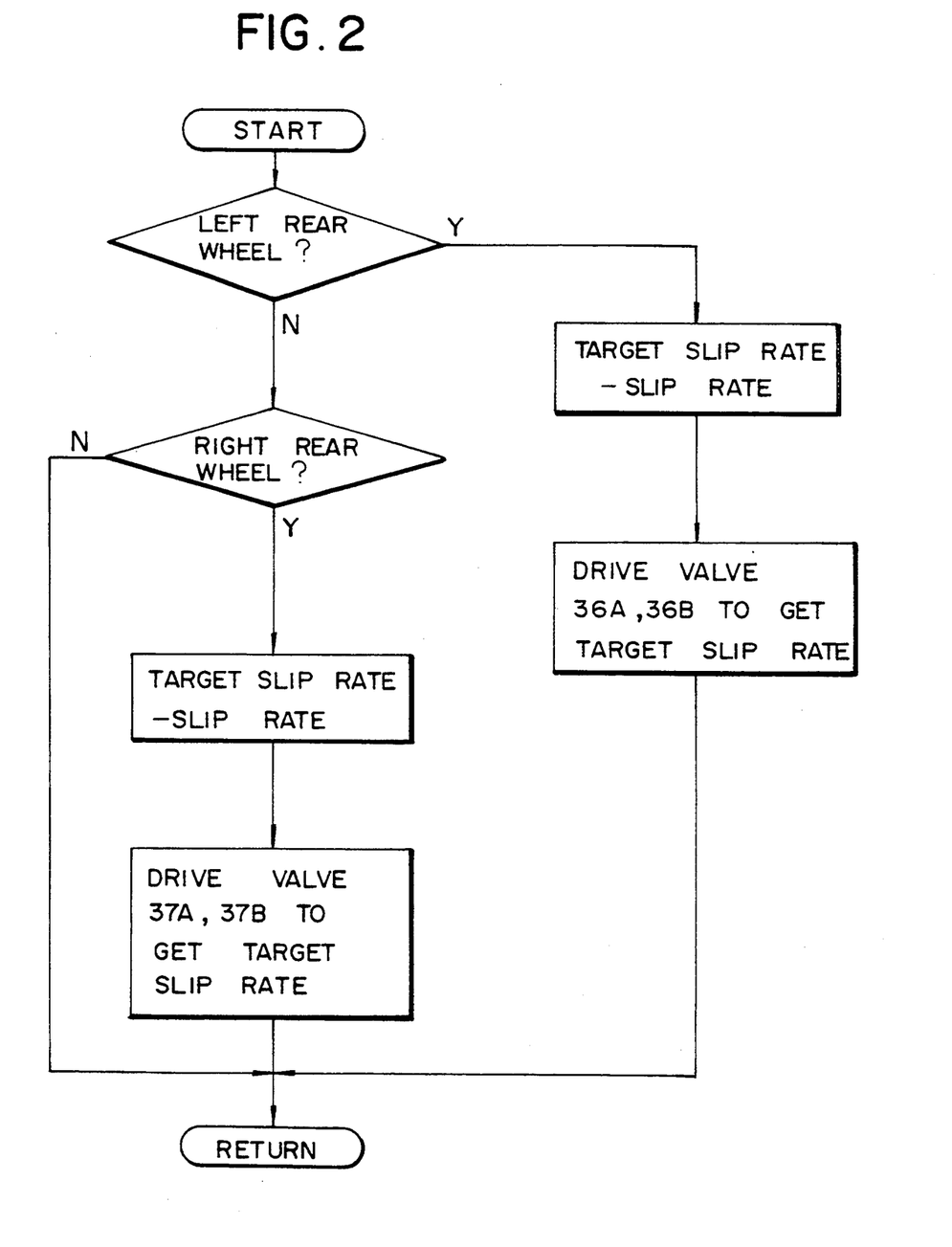
FIG. 2 is a flow chart showing a procedure of a typical traction control.

The traction control is applied to the right and left drive wheels 1RL and 1RR independently when the brake pedal is not treaded on or, in other words, when the vehicle is a non-braking condition. For example, with regard to the left drive wheel 1RL, the traction control is carried out in a known manner such that the slip rate or a speed change of the left drive wheel 1RL is obtained based on the wheel speeds of the wheels 1FL, 1FR, 1RL, 1RR and the braking hydraulic pressure is controlled based on the calculated slip rate by opening and closing the valves 36A and 36B so as to accomplish a target slip rate of the left drive wheel 1RL. Similar control is made for the right drive wheel 1RR. The speed change and the slip rate of the right drive wheel 1RR is calculated and the braking hydraulic pressure is controlled in accordance with the calculated slip rate so as to accomplish a target slip rate for the right drive wheel 1RR (see FIG. 2).

Content of Anti-Skid Control

Next, the anti-skid control will be explained hereinafter.

Figure 3:
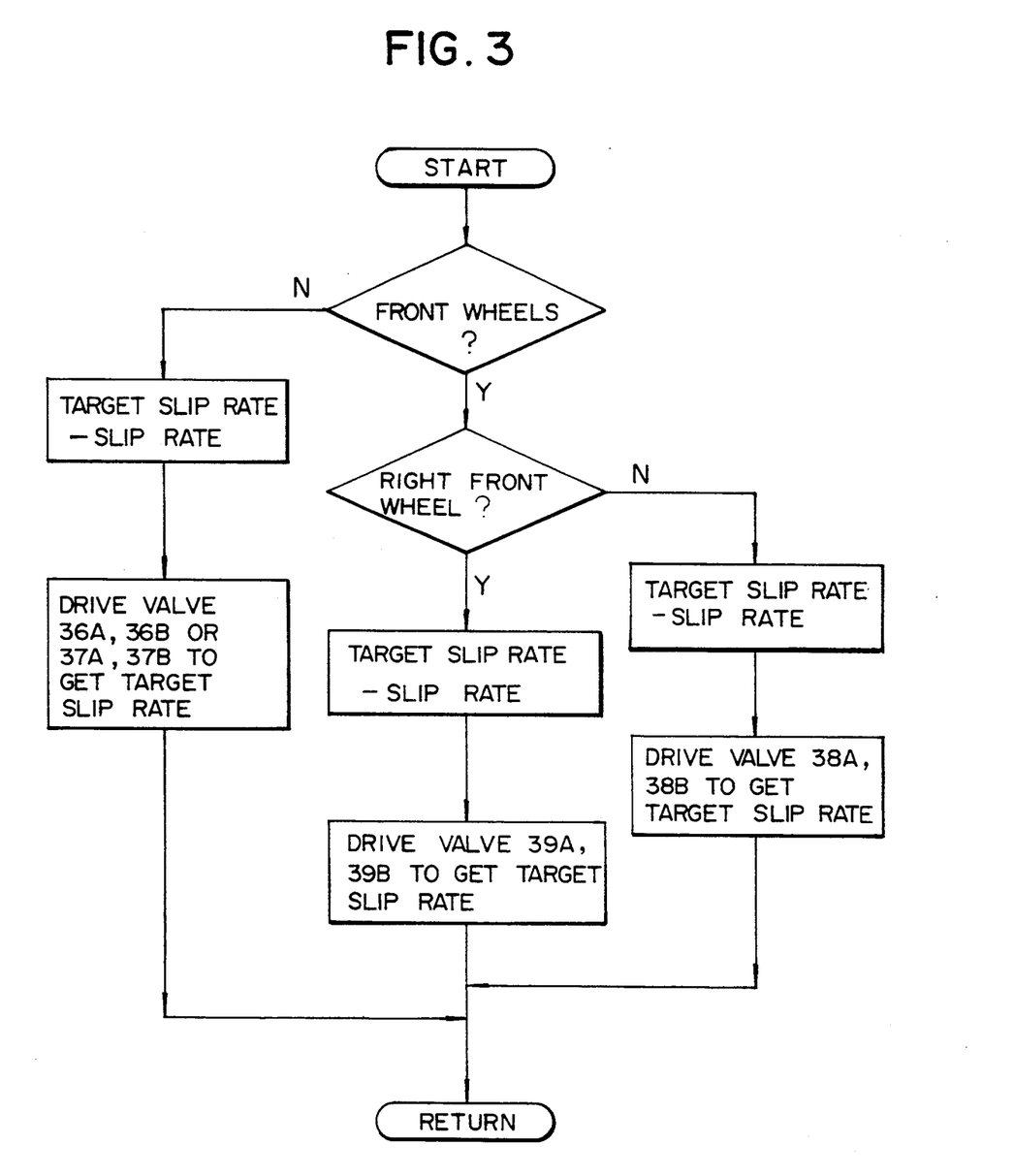
FIG. 3 is a flow chart showing a procedure of a typical anti-skid control.

The anti-skid control is executed by controlling the valves 36A, 37A, 38A, 39A, 36B, 37B, 38B and 39B so as to control the braking hydraulic pressure for the right and left drive wheels 1RL, 1RR commonly and for the right and left passive wheels 1FL, 1FR independently when the brake pedal is treaded on or when the vehicle is in a braking condition. (see FIG. 3)

Figure 4:
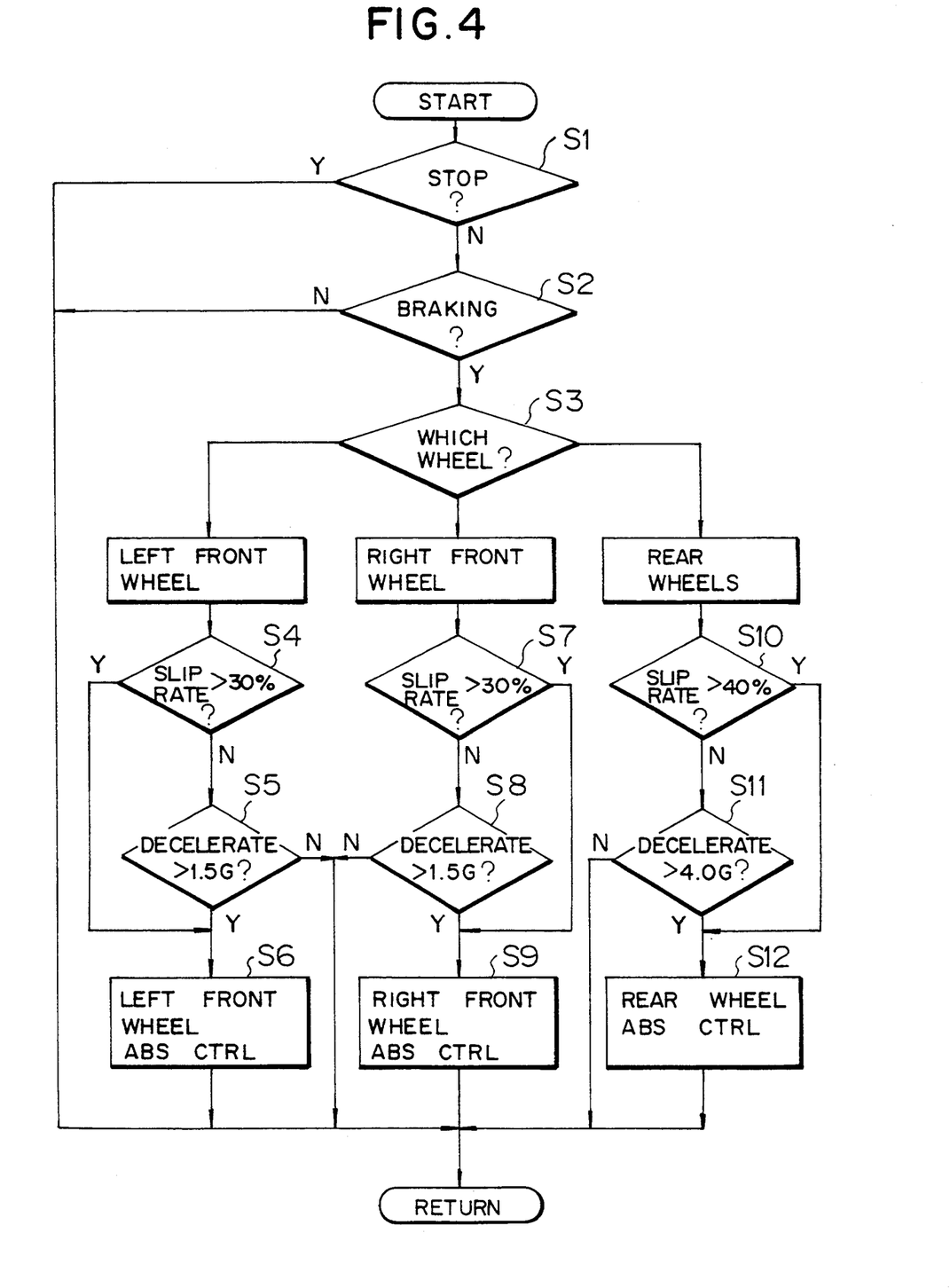
FIG. 4 is an anti-skid control in accordance with the present invention.

Now referring to FIG. 4, the slip control unit USL judges whether or not the vehicle is stopped (S1). In order to make this Judgment, the slip control unit USL calculates rotation speeds or wheel speeds of the wheels 1FL, 1FR, 1RL and 1RR, respectively based on the signals from the sensors 64–67. The slip control unit USL calculates the hypothetical vehicle speed based on the wheel speeds. The hypothetical vehicle speed takes a value related to a maximum value of the wheel speeds and usually greater than the maximum value of the wheel speeds. The hypothetical vehicle speed is modified based on the frictional coefficient of road surface, a change rate of the wheel speed or the acceleration or deceleration of the wheel and the like.

In step S1, the slip control unit USL holds that the vehicle is stopped when the hypothetical vehicle speed is not greater than 5 km/h and the maximum wheel speed is not greater than 2.5 km/h. When the vehicle is not stopped, the slip control unit USL judges based on the brake sensor 68 whether or not the brake pedal 25 is treaded on or whether or not the braking action is made (step S2).

In braking condition, the slip control unit USL finds a wheel to which the anti-skid control is applied (step S3), and determines when the anti-skid control is to be started for the wheel. In determining whether or not the anti-skid control is to be started for the left front wheel 1FL, the slip control unit USL judges whether or not the slip rate is not less than 30%. In this case, the slip rate is defined as follows: slip rate=100-(wheel speed/-hypothetical vehicle speed)×100. If the judgment in step S4 is NO, the slip control unit USL further judges whether or not the deceleration of the wheel is not less than 1.5G(G:acceleration of gravity) in step S5. If the judgement made in either step S4 or step S5 is YES, the slip control unit USL starts the anti-skid control for the left front wheel 1FL (step S6). Namely, the valves 38A and 38B are actuated to hold or reduce the braking hydraulic pressure for the left front wheel 1FL.

For the right front wheel 1FR, the slip control unit USL judges the same conditions as the left front wheel 1FL independently (steps S7-S9). The valves 39A and 39B are actuated based on the result of the judgments in steps S7-S9 so as to control the braking hydraulic pressure.

With regard to the rear wheels or drive wheels 1RL, 1RR, judgments are made commonly for the rear wheels 1RL, 1RR as to whether or not the anti-skid control is to be started. Then, if the judgment is made to start the anti-skid control, the control is executed identically for both the right and left drive wheels 1RR, 1RL. Conditions for initiating the anti-skid control of the rear wheels 1RR, 1RL are tighter than those of the front wheels 1FR, 1FL so that the anti-skid control for the rear wheels 1RR, 1RL is relatively more difficult to start as compared to the control for the front wheels. In this case, when the slip rate of either the right rear wheel 1RR or the left rear wheel 1RL exceeds 40% (step S10), or when the deceleration of either the right rear wheel 1RR or the left rear wheel 1RL exceeds 4.0G (step S11), the valves 36A, 36B, 37A and 37B are actuated to start the anti-skid control(step S12).

Thus, whenever the anti-skid control is executed for the drive wheels 1RR, 1RL, the anti-skid control has been executed for the passive wheels 1FR, 1FL. As a result, even though the traction control has been made just before the anti-skid control is started, the traction control does not affect the anti-skid control. Consequently, a problem in that the traction control interferes the anti-skid control to incur a shortage of braking force can be solved (step S12).

In the illustrated embodiment, both the slip rate of the wheels and the deceleration of the wheels are employed in judging whether or not the anti-skid control is to be started. However, either one of them can be properly employed for the control.

Alternatively, the respective braking hydraulic pressures for the right and left drive wheels 1RR, 1RL are detected. The anti-skid control can be started when the difference in the braking hydraulic pressures between the right and left wheels are substantially eliminated.

Anti-skid Control After Traction Control

As aforementioned, the braking hydraulic pressure is controlled under both the traction control and the anti-skid control for the drive wheels. When the brake pedal is treaded on during the traction control in the case where the traction control is made independently for the right and left drive wheels 1RR, 1RL and the anti-skid is made commonly for the drive wheels 1RR, 1RL, if the traction control is immediately stopped and the anti-skid control is concurrently started, a shortage of braking force may occur.

In another embodiment, a device is provided for delaying starting timing of the anti-skid control in order to eliminate the problem of the shortage of the braking force.

This device delays the start of the anti-skid control in the case where the anti-skid control is to be started just after the termination of the traction control as compared to the case where the anti-skid control is to be started a certain time period after the termination of the traction control. Specifically, a threshold for starting the anti-skid control such as the slip rate, deceleration of the wheel and the like, is determined at such a value that the anti-skid control is more difficult to start just after the termination of the traction control compared to a certain time period after the termination of the traction control.

Figure 5:
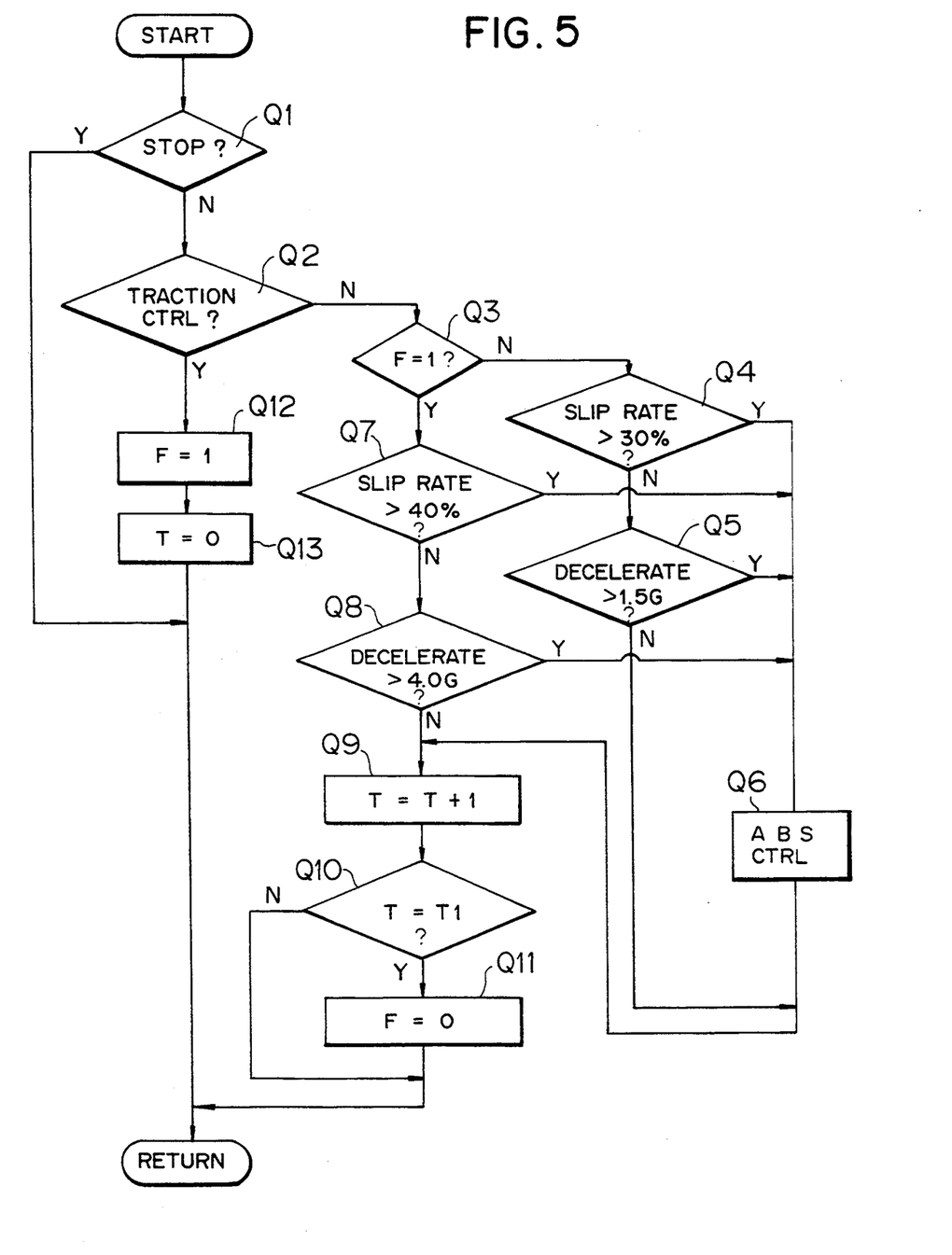
FIGS. 5, 6, 7, 8, and 9 are flow charts showing an anti-skid control of respective embodiments in accordance with the present invention.

Referring to FIG. 5, the slip control unit USL judges whether or not the vehicle is stopped, that is, whether or not the hypothetical vehicle speed is greater than 5 km/h and whether or not the deceleration of the wheel is smaller than 2.5 km/h in step Q1. If the vehicle is not stopped, the slip control unit USL judges whether or not the traction control is being executed in step Q2. If the judgment is NO in step Q2, the slip control unit USL judges whether or not flag F has a value of 1 in step Q3. When the flag F is at a value of 1, it is just after the termination of the traction control. If the certain time period T1 has passed after the termination of the traction control, the slip control unit USL judges whether or not the slip rate is greater than 30% in step Q4 and whether or not the deceleration of the wheel is greater than 1.5G in step Q5. If the judgment in either step Q4 or Q5 is Yes, the anti-skid control is started in step Q6. If the judgment in step Q3 is Yes, namely, if it is just after the termination of the traction control, the slip control unit USL judges whether or not the slip rate is greater than 40% in step Q7 and whether or not the deceleration of the wheel is greater than 4.0G in step Q8. If the judgment in either step Q7 or Q8 is Yes, the control unit USL executes the anti-skid control in step Q6. Thereafter, the control unit USL increases the timer T in step Q9. In step Q10, the control unit USL judges whether or not the timer T has reached the certain value T1. If the judgment is Yes, the control unit USL provides O as the value of the flag F in step Q11. Meanwhile, the timer T and flag F are reset in steps Q12 and Q13 during the traction control. It will be understood that the anti-skid control is more difficult to start if it is just after the termination of the traction control as compared to a certain period after the termination of the traction control.

Figure 6:
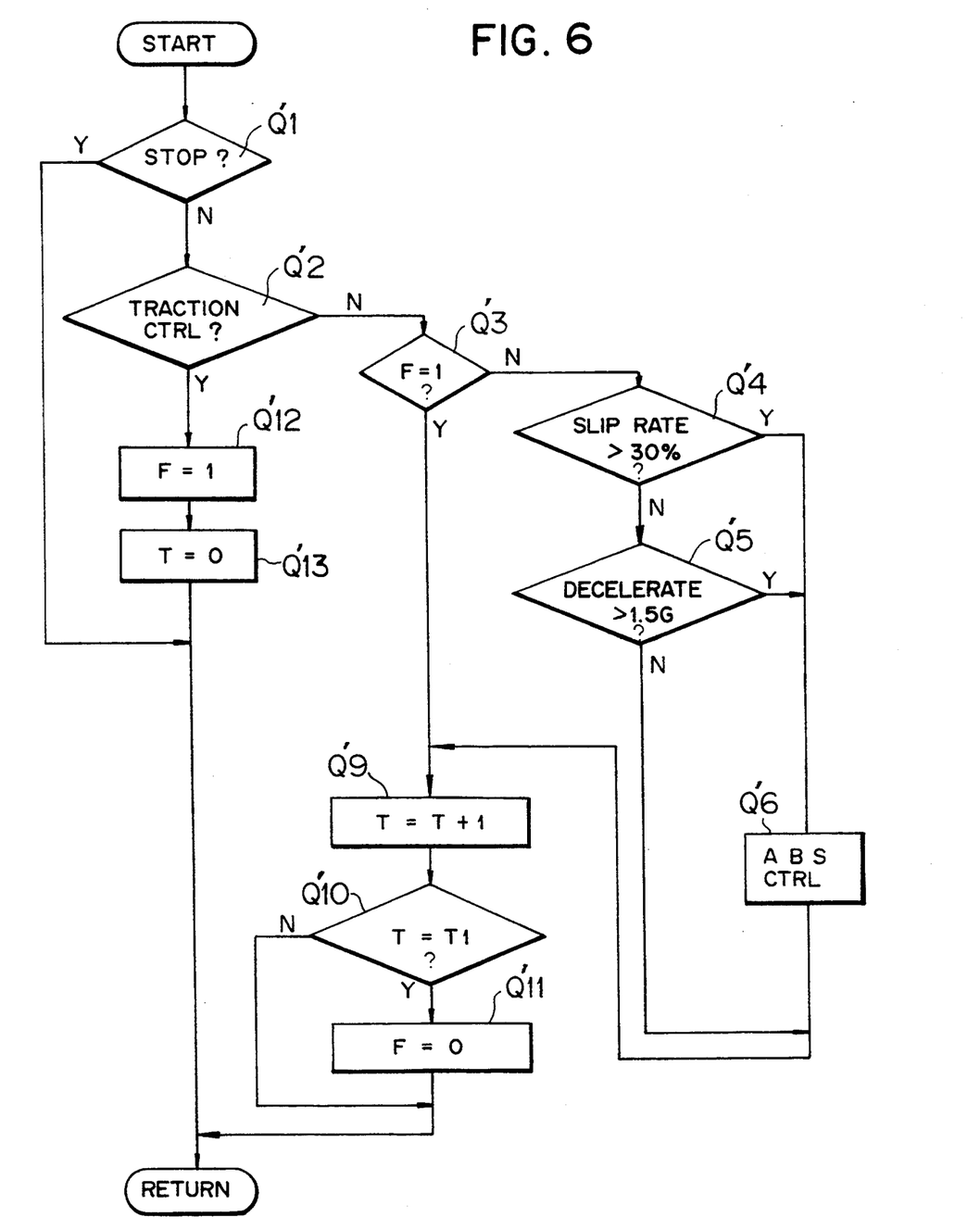

Referring to FIG. 6, there is shown a flow chart according to another embodiment of the control. In this illustrated embodiment, the anti-skid control is not started until the certain time period has passed after the termination of the traction control, in spite of changing the threshold as in the embodiment of FIG. 5.

The device for delaying the start of the anti-skid control delays the start of the control when the residual hydraulic pressure for the rear wheels is greater than a predetermined value. In this case, the threshold is determined at such a value that the anti-skid control is more difficult to start when the residual pressure for either one of the drive wheels is greater than the predetermined value compared to when it is smaller than the predetermined value.

Figure 7:
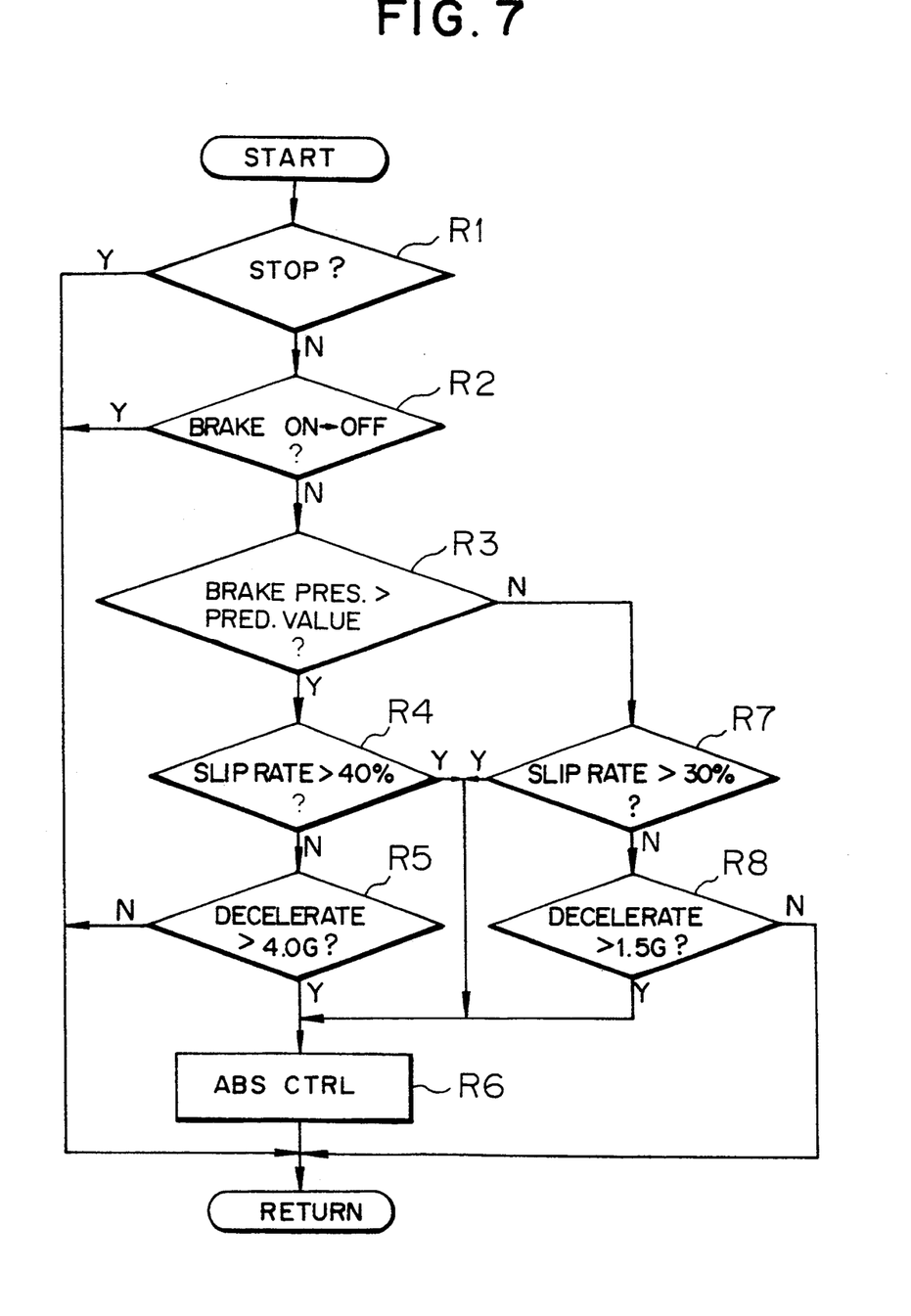

Referring to FIG. 7, the control unit USL judges whether or not the vehicle is stopped, that is, whether or not the hypothetical vehicle speed is greater than 5 km/h and whether or not the deceleration of the wheel is smaller 2.5 km/h in step R1. Then, the control unit USL judges whether or not the brake pedal is released after it has been treaded on in step R2. If this judgment is Yes, the control unit USL judges in step R3 whether or not the braking hydraulic pressure for one of the drive wheels is greater than a predetermined value after the traction control is terminated. If the hydraulic pressure is smaller than the predetermined value, the slip control unit USL judges whether or not the slip rate is greater than 30% in step R7 and whether or not the deceleration of the wheel is greater than 1.5G in step R8. If the judgment in either step R7 or R8 is Yes, the anti-skid control is started in step R6. If the judgement in step R3 is Yes, namely, if it is just after the termination of the traction control and thus the residual hydraulic pressure is greater than the predetermined value in either one of the drive wheels, the slip control unit USL judges whether or not the slip rate is greater than 40% in step R4 and whether or not the deceleration of the wheel is greater than 4.0G in step R5. If the judgment in either step R4 or R5 is Yes, the anti-skid control is started in step R6.

Figure 8:
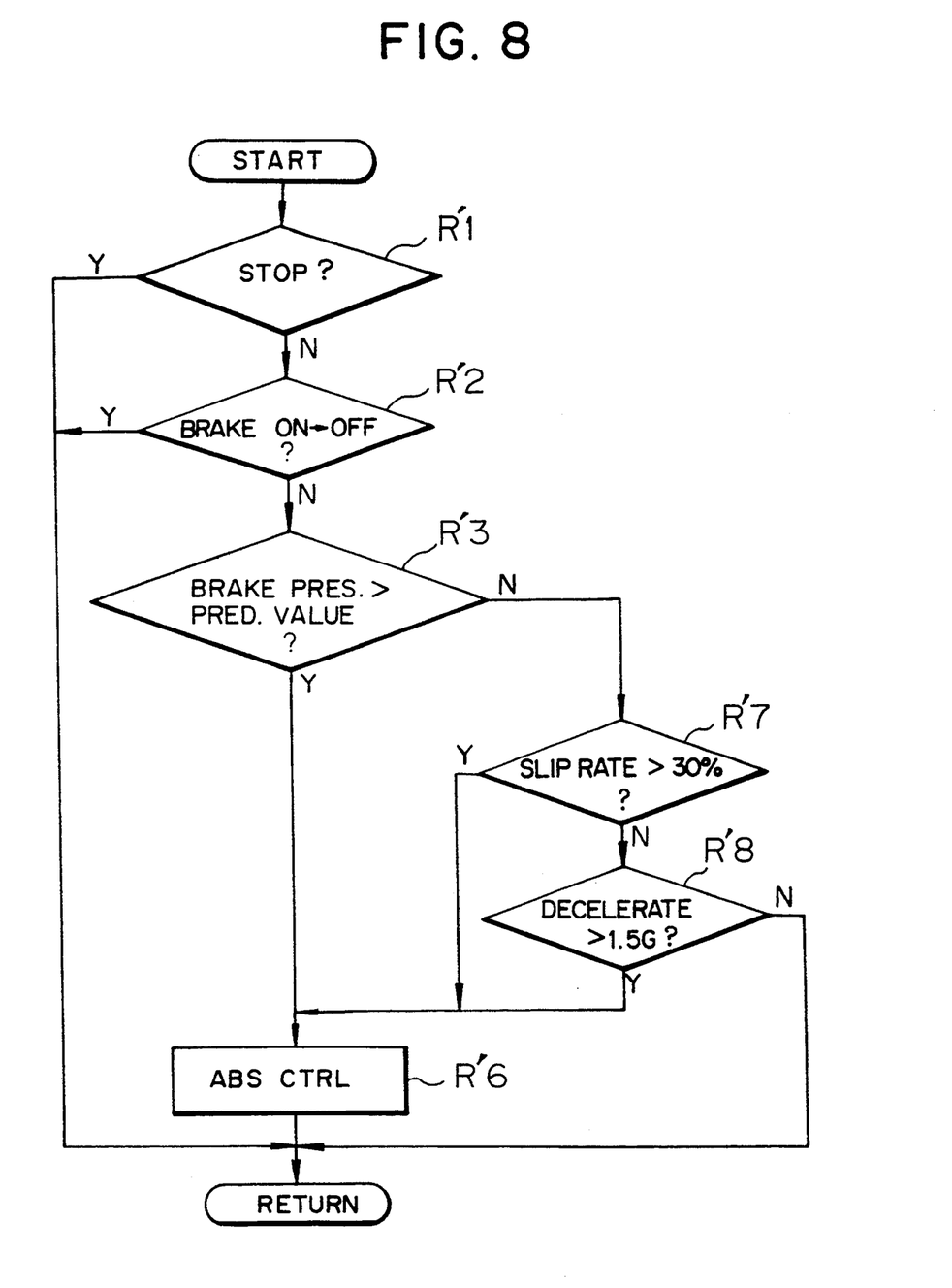

Referring to FIG. 8, there is shown a flow chart according to another embodiment of the control. In this illustrated embodiment, the anti-skid control is not started until the certain time period has passed after the termination of the traction control in spite of changing the threshold as the embodiment shown in FIG. 7.

In a further embodiment, the device for delaying the start of the anti-skid control delays the start of the control when the difference of the residual hydraulic pressure between the right and left rear wheels is greater than a predetermined value. In this case, the threshold is determined at such a value that the anti-skid control is more difficult to start when the pressure difference of the drive wheels is greater than the predetermined value than when the pressure difference is smaller than the predetermined value.

Figure 9:
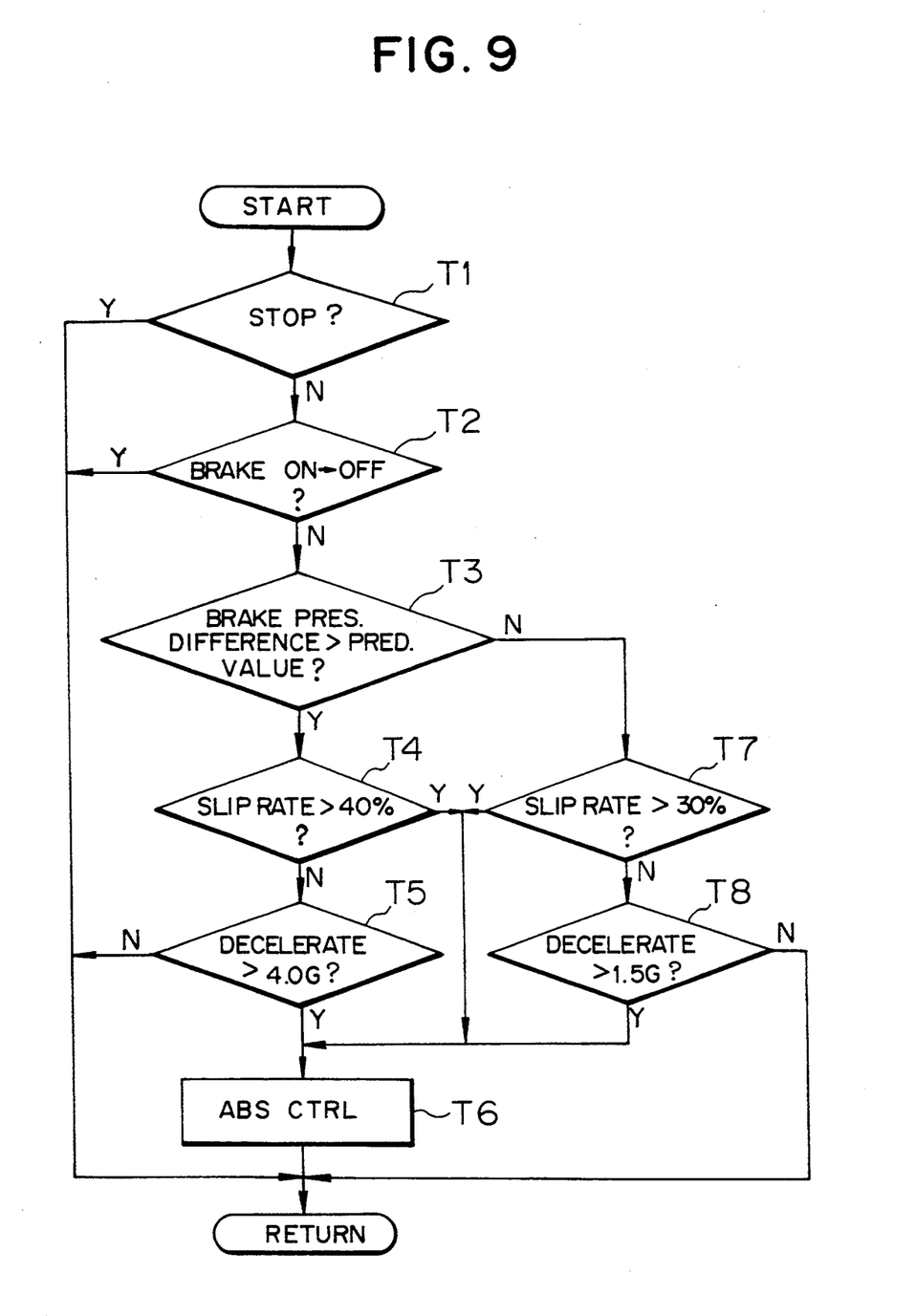

Referring to FIG. 9, the control unit USL judges whether or not the vehicle is stopped, that is, whether or not the hypothetical vehicle speed is greater than 5 km/h and whether or not the deceleration of the wheel is smaller 2.5 km/h in step T1. Then, the control unit USL judges whether or not the brake pedal is released after it has been treaded on in step T2. If this judgment is Yes, the control unit USL judges in step T3 whether or not the pressure difference between the right and left drive wheels is greater than a predetermined value after the traction control is terminated. If the hydraulic pressure is smaller than the predetermined value, the slip control unit USL judges whether or not the slip rate is greater than 30% in step T7 and whether or not the deceleration of the wheel is greater than 1.5G in step T8. If the judgment in either step T7 or T8 is Yes, the anti-skid control is started in step T6. If the judgment in step T3 is Yes, namely, if it is just after the termination of the traction control and thus the pressure difference of the residual hydraulic pressure between the right and left drive wheels is greater than the predetermined value, the slip control unit USL judges whether or not the slip rate is greater than 40% in step T4 and whether or not the deceleration of the wheel is greater than 4.0G in step T5. If the judgment in either step T4 or T5 is Yes, the anti-skid control is started in step T6.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A slip control system for a vehicle having at least right ad left drive wheels comprising:

traction control means for controlling a slip rate of a wheel by controlling a braking hydraulic pressure for the wheel under a non-braking condition during a traction control of the slip rate, the traction control of the slip rate by the traction control means being applied independently on the right and left drive wheels, anti-skid control means for controlling the slip rate of a wheel by controlling the braking hydraulic pressure for the wheel under a braking condition during an anti-skid control of the slip rate, the anti-skid control of the slip rate by the anti-skid control means being applied commonly on the right and left drive wheels, and restriction means for restricting an onset timing of the anti-skid control of the slip rate of the right and left drive wheels by the anti-skid control means so that the onset timing of the anti-skid control is delayed when the anti-skid control is carried out within a relatively short time after the traction control is made by the traction control means as compared with a situation in which the anti-skid control is carried out a relatively long time after the traction control is made by the traction control means.

2. A slip control system as recited in claim 1, wherein a threshold value as to when the anti-skid control means starts controlling the slip rate of the wheel is provided for each drive and passive wheel, and wherein the threshold value for the drive wheels is determined so that the anti-skid control applied on the drive wheels is started after the anti-skid control is applied on passive wheels.

3. A slip control system as recited in claim 1 wherein the threshold value is provided based on a hypothetical vehicle speed.

4. A slip control system as recited in claim 1, wherein the restriction means controls the anti-skid control means to start controlling the braking hydraulic pressure after braking hydraulic pressures for the right and left drive wheels are settled to have substantially the same value 5. A slip control system as recited in claim 1, wherein the restriction means delays the start of the control of the slip rate by the anti-skid control means for the anti-skid drive wheels whenever the traction control terminates.

6. A slip control system as recited in claim 1, wherein the restriction means delays the start of the anti-skid control when a residual hydraulic pressure for either one of the drive wheels, resulting from the traction control, is greater than a predetermined value.

7. A slip control system as recited in claim 6, wherein a threshold is determined at such a value that the anti-skid control can be started at a lower slip rate when the residual hydraulic pressure is smaller than the predetermined value than when the residual hydraulic pressure is larger than the predetermined value.

8. A slip control system as recited in claim 7, wherein a hypothetical vehicle speed, based on wheel speeds of all wheels of the vehicle, is determined and the anti-skid control is started when the slip rate of either one of the drive wheels, defined as 100-100×wheel speed of said one of the drive wheels/hypothetical vehicle speed, exceeds 40 and the residual hydraulic pressure is greater than the predetermined value.

9. A slip control system as recited in claim 7, wherein the anti-skid control is started when a deceleration of either one of the drive wheels exceeds 4.0G in the case where the residual hydraulic pressure is greater than the predetermined value.

10. A slip control system as recited in claim 7, wherein a hypothetical vehicle speed, based on wheel speeds of all wheels of the vehicle, is determined and the anti-skid control is started when the slip rate of either one of the drive wheels, defined as 100-100×wheel speed of said one of the drive wheels/hypothetical vehicle speed, exceeds 30 and the residual hydraulic pressure is smaller than the predetermined value.

11. A slip control system as recited in claim 7, wherein the anti-skid control is started when a deceleration, either one of the drive wheels exceeds 1.5G and the residual hydraulic pressure is smaller than the predetermined value.

12. A slip control system as recited in claim 1, wherein the restriction means provides a threshold value for delaying the anti-skid control based on a deceleration of a wheel.

13. A slip control system as recited in claim 1, wherein the restriction means prohibits the start of reduction and holding of the braking hydraulic pressure under the anti-skid control when the anti-skid control is executed just after termination of the traction control.

14. A slip control system as recited in claim 1, wherein the anti-skid control is executed both for right and left drive wheels commonly and for right and left passive wheels independently under said braking condition.

15. A slip control system as recited in claim 1, wherein a threshold for starting the anti-skid control is determined at such a value that the anti-skid control can be started at a lower slip rate a certain time period after termination of the traction control than just after termination of the traction control.

16. A slip control system as recited in claim 15, wherein a hypothetical vehicle speed, based on wheel speeds of all wheels of the vehicle, is determined and the anti-skid control is started when the slip rate of either one of the drive wheels, defined as 100-100×wheel speed of said one of the drive wheels/hypothetical vehicle speed, exceeds 40 just after termination of the traction control.

17. A slip control system as recited in claim 15, wherein the anti-skid control is started when a deceleration either one of the drive wheels exceeds 4.0G just after termination of the traction control.

18. A slip control system as recited in claim 15, wherein a hypothetical vehicle speed, based on wheel speeds of all wheels of the vehicle, is determined and the anti-skid control is started when the slip rate of either one of the drive wheels, defined as 100-100×wheel speed of said one of the drive wheels/hypothetical vehicle speed, exceeds 30 a certain time period after termination of the traction control.

19. A slip control system as recited in claim 15, wherein the anti-skid control is started when a deceleration of either one of the drive wheels exceeds 1.5G a certain time period after termination of the traction control.

20. A slip control system as recited in claim 1, wherein the restriction means delays the start of the anti-skid control when a difference in residual hydraulic pressure between right and left rear wheels is greater than a predetermined value.

21. A slip control system as recited in claim 20, wherein a threshold is determined at such a value that the anti-skid control can be started at a lower slip rate when the difference in residual hydraulic pressure between the drive wheels is smaller than the predetermined value than when the difference is greater than the predetermined value.

22. A slip control system as recited in claim 21, wherein a hypothetical vehicle speed, based on wheel speeds of all wheels of the vehicle, is determined and the anti-skid control is started when the slip rate of either one of the drive wheels, defined as 100-100×wheel speed of said one of the drive wheels/hypothetical vehicle speed, exceeds 40 and the pressure difference is greater than the predetermined value.

23. A slip control system as recited in claim 21, wherein the anti-skid control is started when a deceleration either one of the drive wheels exceeds 4.0G and the pressure difference is greater than the predetermined value.

24. A slip control system as recited in claim 21, wherein a hypothetical vehicle speed, based on wheel speeds of all wheels of the vehicle, is determined and the anti-skid control is started when the slip rate of either one of the drive wheels, defined as 100-100×wheel speed of said one of the drive wheels/hypothetical vehicle speed, exceeds 30 and the pressure difference is smaller than the predetermined value.

25. A slip control system as recited in claim 21, wherein the anti-skid control is started when a deceleration either one of the drive wheels exceeds 1.5G and the pressure difference is smaller than the predetermined value.

26. A slip control system for a vehicle having at least right and left drive wheels comprising:
   traction control means for controlling a slip rate of a wheel by controlling a braking hydraulic pressure for the wheel under a non-braking condition during a traction control of the slip rate, the traction control of the slip rate by the traction control means being applied independently on the right and left drive wheels,
   anti-skid control means for controlling the slip rate of a wheel by controlling the braking hydraulic pressure for the wheel under a braking condition during an anti-skid control of the slip rate, the anti-skid control of the slip rate by the anti-skid control means being applied commonly on the right and left drive wheels, and
   restriction means for restricting an onset timing of the anti-skid control of the slip rate of the right and left drive wheels by the anti-skid control means so that the onset timing of the anti-skid control is not made until braking hydraulic pressures acting on the right and left drive wheels reach substantially the same value.

* * * * *